United States Patent
Kato et al.

(10) Patent No.: US 11,710,628 B2
(45) Date of Patent: Jul. 25, 2023

(54) INFRARED LIGHT RADIATION DEVICE

(71) Applicant: NGK INSULATORS, LTD., Nagoya (JP)

(72) Inventors: Daiki Kato, Nagoya (JP); Yoshio Kondo, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 903 days.

(21) Appl. No.: 16/577,270

(22) Filed: Sep. 20, 2019

(65) Prior Publication Data

US 2020/0110252 A1   Apr. 9, 2020

(30) Foreign Application Priority Data

Oct. 5, 2018   (JP) .................... 2018-190005

(51) Int. Cl.
| | | |
|---|---|---|
| *H01K 1/30* | (2006.01) | |
| *H01K 1/18* | (2006.01) | |
| *H05B 3/00* | (2006.01) | |
| *H01K 1/10* | (2006.01) | |
| *G02B 19/00* | (2006.01) | |
| *G02B 1/00* | (2006.01) | |

(52) U.S. Cl.
CPC ............... *H01K 1/30* (2013.01); *H01K 1/10* (2013.01); *H01K 1/18* (2013.01); *H05B 3/0033* (2013.01); *G02B 1/002* (2013.01); *G02B 19/009* (2013.01); *G02B 19/0028* (2013.01)

(58) Field of Classification Search
None
See application file for complete search history.

(56) References Cited

U.S. PATENT DOCUMENTS

| | | | | | |
|---|---|---|---|---|---|
| 2,045,564 | A | * | 6/1936 | Bear | F21S 41/47 362/256 |
| 3,167,258 | A | * | 1/1965 | Wilde | F21V 31/00 439/237 |
| 3,237,284 | A | * | 3/1966 | Bird | H01K 3/02 313/344 |
| 4,015,157 | A | * | 3/1977 | Roller | H01K 1/20 313/271 |
| 4,804,878 | A | * | 2/1989 | Hough | H01K 3/16 445/27 |

(Continued)

FOREIGN PATENT DOCUMENTS

| | | | | | |
|---|---|---|---|---|---|
| CA | 2506332 | A1 | * | 1/2006 | ............ H05B 3/009 |
| GB | 2415771 | A | * | 1/2006 | ............ H05B 3/009 |

(Continued)

OTHER PUBLICATIONS

Japanese Office Action (Application No. 2018-190005) dated Jun. 1, 2021 (with English translation).

*Primary Examiner* — Thor S Campbell
(74) *Attorney, Agent, or Firm* — Burr Patent Law, PLLC

(57) ABSTRACT

An infrared light radiation device includes a radiation unit and a condenser. The radiation unit includes a heater and a metamaterial structure. The metamaterial structure is able to radiate, when heat energy is input from the heater, infrared light having a peak wavelength of a non-Planck distribution. The condenser includes at least one condensing lens that concentrates and transmits toward outside the infrared light radiated from the radiation unit.

6 Claims, 5 Drawing Sheets

(56) References Cited

U.S. PATENT DOCUMENTS

| | | | | |
|---|---|---|---|---|
| 4,942,331 A * | 7/1990 | Bergman | | H01K 1/24 |
| | | | | 313/274 |
| 5,438,233 A * | 8/1995 | Boland | | H01K 1/28 |
| | | | | 313/112 |
| 6,252,338 B1 * | 6/2001 | Bergman | | H01J 61/025 |
| | | | | 362/255 |
| 7,300,177 B2 * | 11/2007 | Conner | | G02B 19/0014 |
| | | | | 362/244 |
| 2003/0007363 A1 * | 1/2003 | Yagi | | H01K 1/30 |
| | | | | 362/509 |
| 2004/0008981 A1 * | 1/2004 | Woo | | H01L 21/67115 |
| | | | | 392/424 |
| 2007/0081248 A1 * | 4/2007 | Wu | | G02B 5/10 |
| | | | | 359/586 |
| 2010/0164349 A1 | 7/2010 | Kazmierski | | |
| 2010/0327745 A1 * | 12/2010 | Dassanayake | | F21K 9/64 |
| | | | | 315/35 |
| 2019/0021139 A1 | 1/2019 | Kondo | | |
| 2019/0246457 A1 | 8/2019 | Aoki et al. | | |
| 2020/0033056 A1 * | 1/2020 | Aoki | | F28F 13/18 |
| 2020/0110252 A1 * | 4/2020 | Kato | | H01K 1/18 |

FOREIGN PATENT DOCUMENTS

| | | | | |
|---|---|---|---|---|
| JP | 2010-157381 A1 | | 7/2010 | |
| JP | 2014-149976 A1 | | 8/2014 | |
| JP | 2015198063 A | * | 11/2015 | |
| TW | 533470 A | * | 5/2003 | |
| WO | 2017/163986 A1 | | 9/2017 | |
| WO | 2018/079386 A1 | | 5/2018 | |
| WO | WO-2019208252 A1 | * | 10/2019 | ........... H05B 3/0033 |

* cited by examiner

INFRARED LIGHT RADIATION DEVICE

BACKGROUND OF THE INVENTION

1. Field of the Invention

The present invention relates to an infrared light radiation device.

2. Description of the Related Art

Related-art infrared light radiation devices employing metamaterial structures are known. For example, PTL 1 describes a radiation device that includes a heat source, a metamaterial structure layer disposed on the front surface side of the heat source and a rear surface metal layer disposed on the rear surface side of the heat source. The metamaterial structure layer radiates the heat energy input from the heat source as radiation energy of a specific wavelength region.

CITATION LIST

Patent Literature

PTL 1: WO 2017/163986 A1

SUMMARY OF THE INVENTION

Meanwhile, there exist demands for efficiently radiating infrared light to an object by concentrating the infrared light in the infrared radiation devices employing the metamaterial structure. However, concentration of the infrared light is not considered in PTL 1.

The present invention is made to address such a problem, and a main object of the present invention is to radiates infrared light to an object in a concentrated manner.

To achieve the above-described principal object, the following configuration is employed in the present invention.

An infrared light radiation device of the present invention includes a radiation unit that includes a heater, and a metamaterial structure that is able to radiate, when heat energy is input from the heater, infrared light having a peak wavelength of a non-Planck distribution and a condenser that includes at least one condensing lens that concentrates and transmits toward outside the infrared light radiated from the radiation unit.

With this infrared light radiation device, the infrared light having the peak wavelength of the non-Planck distribution is radiated from the metamaterial structure. In other words, the infrared light of a specific wavelength region is selectively radiated from the metamaterial structure. The radiated infrared light is concentrated and radiated toward the outside by the condenser. Accordingly, the infrared light radiation device can radiate the infrared light radiated from the metamaterial structure toward the object in a concentrated manner.

The infrared light radiation device according to the present invention may include a reflector that reflects to the condenser the infrared light radiated from the radiation unit. Thus, at least part of the infrared light not directly radiated to the condenser from the radiation unit can also be radiated toward the condenser by reflection. Accordingly, the infrared light radiation device can efficiently radiate the infrared light to the object. In this case, a reflection surface of the reflector may have a curved shape in section. The curved shape may be any one of a parabolic shape, an arc of an ellipse, and an arc of a circle.

In the infrared light radiation device according to the present invention in a form in which the reflector is provided, the metamaterial structure may include a first metamaterial structure and a second metamaterial structure. The first metamaterial structure radiates the infrared light from a first radiation surface. The second metamaterial structure radiates the infrared light from a second radiation surface. The reflector, the second metamaterial structure, the heater, the first metamaterial structure, and the condenser may be arranged in this order. Thus, the radiation unit can radiate the infrared light having the peak wavelength of the non-Planck distribution from the first radiation surface and the second radiation surface. In other words, the radiation unit can selectively radiate the infrared light of the specific wavelength region from both sides. Accordingly, compared to the case where, for example, the radiation unit includes only one of the first metamaterial structure and the second metamaterial structure, radiation of, from the radiation unit, infrared light of unnecessary wavelengths not included in the specific wavelength region can be suppressed. Furthermore, the first and second metamaterial structures are interposed between the reflector and the condenser. Thus, the infrared light radiated from both the first and second radiation surfaces is likely to reach the condenser directly or through the reflector. Accordingly, the infrared light radiation device can efficiently radiate the infrared light to the object.

In the infrared light radiation device according to the present invention in the form in which the reflector is provided, the metamaterial structure may include a first metamaterial structure and a second metamaterial structure. The first metamaterial structure radiates the infrared light from a first radiation surface. The second metamaterial structure radiates the infrared light from a second radiation surface. The first metamaterial structure, the heater, and the second metamaterial structure may be arranged in this order in a direction perpendicular to a direction in which the radiation unit and the condenser are arranged. The first metamaterial structure and the second metamaterial structure may be interposed between one and another sides of the reflector. Thus, the radiation unit can radiate the infrared light having the peak wavelength of the non-Planck distribution from the first radiation surface and the second radiation surface. In other words, the radiation unit can selectively radiate the infrared light of the specific wavelength region from both sides. Accordingly, compared to the case where, for example, the radiation unit includes only one of the first metamaterial structure and the second metamaterial structure, radiation of, from the radiation unit, infrared light of unnecessary wavelengths not included in the specific wavelength region can be suppressed. Furthermore, the first and second metamaterial structures are interposed between both sides of the reflector. Thus, the infrared light radiated from both the first and second radiation surfaces is likely to reach the condenser directly or through the reflector. Accordingly, the infrared light radiation device can efficiently radiate the infrared light to the object.

In the infrared light radiation device according to the present invention in the form in which the reflector is provided, the reflector may cover a region opposite the condenser relative to the radiation unit, and an end portion of the reflector may extend further toward the condenser than the radiation unit so as to position the radiation unit inside the reflector. Thus, the infrared light radiation device can reduce the amount of the infrared light that is directed toward neither the condenser nor the reflector and that does not reach the object. Accordingly, the infrared light radiation device can efficiently radiate the infrared light to the object.

In the infrared light radiation device according to the present invention, a focal length of the at least one condensing lens may be 100 mm or larger when collimated light is incident on the at least one condensing lens from a side at which the radiation unit is disposed. When the focal length of the condensing lens is 100 mm or larger, an increase in temperature of the object due to, for example, heat transfer caused by convection can be suppressed by sufficiently increasing the distance between the object and the radiation unit, and the infrared light can be radiated toward the object in a concentrated manner. Accordingly, the infrared light radiation device can appropriately radiate the infrared light toward the object on which, for example, it is wished to perform a process using the infrared light while suppressing heating of the object as much as possible.

In the infrared light radiation device according to the present invention, the metamaterial structure may include a first conductor layer, a dielectric layer, and a second conductor layer that are arranged in this order from the heater. The dielectric layer is coupled to the first conductor layer. The second conductor layer includes a plurality of individual conductor layers which are coupled to the dielectric layer and which are spaced from one another so as to be periodically disposed. When the metamaterial structure includes the above-described first and second metamaterial structures, each of the first and second metamaterial structures may include the first conductor layer, the dielectric layer, and the second conductor layer.

In the infrared light radiation device according to the present invention, the metamaterial structure may have a plurality of micro-cavities spaced from one another so as to be periodically disposed. In this case, at least a surface of each of the plurality of micro-cavities is formed of a conductor. When the metamaterial structure includes the above-described first and second metamaterial structures, each of the first and second metamaterial structures may have the plurality of micro-cavities.

BRIEF DESCRIPTION OF THE DRAWINGS

FIG. 2 is a bottom view of part of a first metamaterial structure 30a.

DETAILED DESCRIPTION OF THE INVENTION

Figure 1:
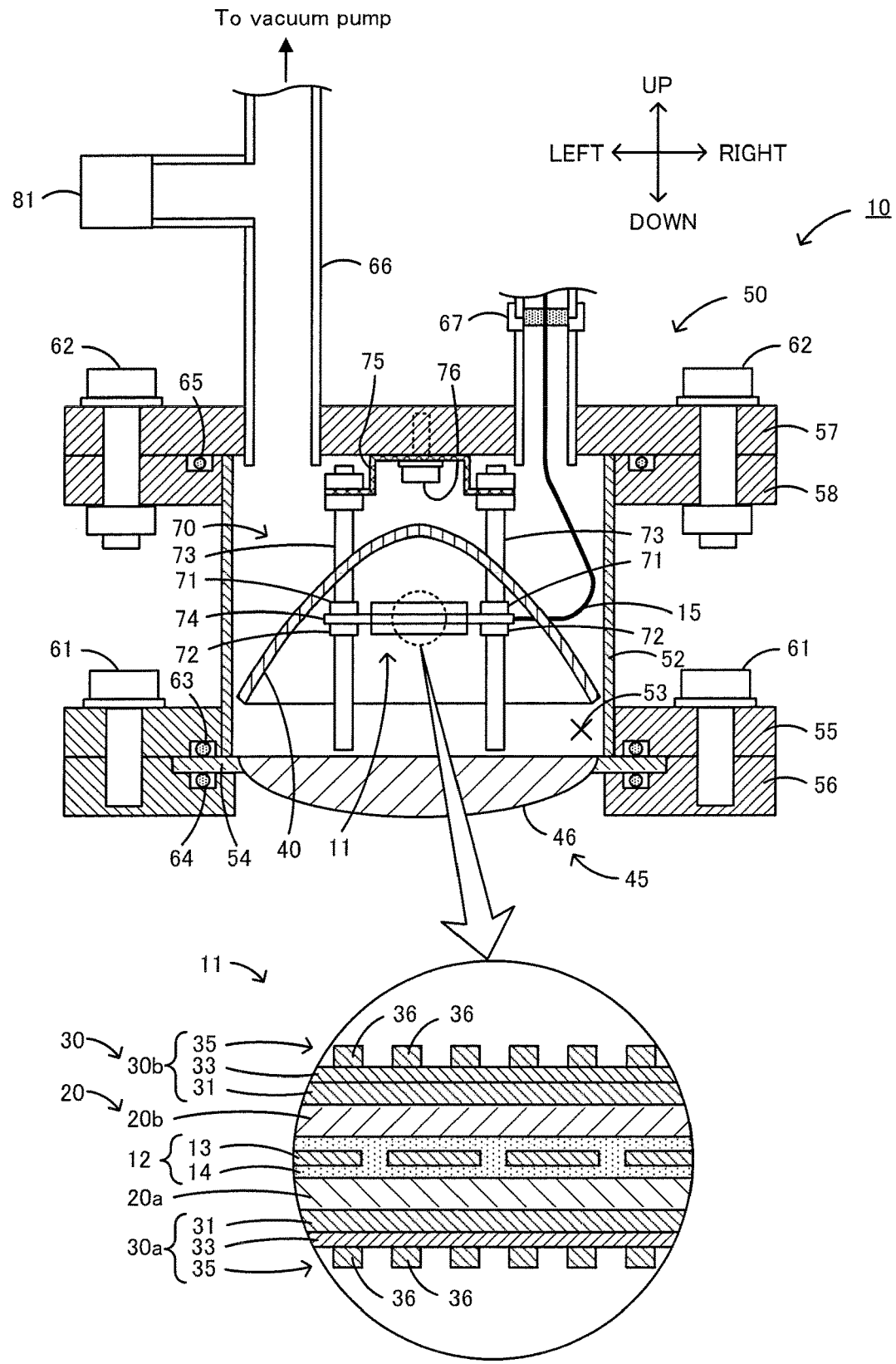
FIG. 1 is a schematic sectional view of an infrared light radiation device 10.
Figure 2:
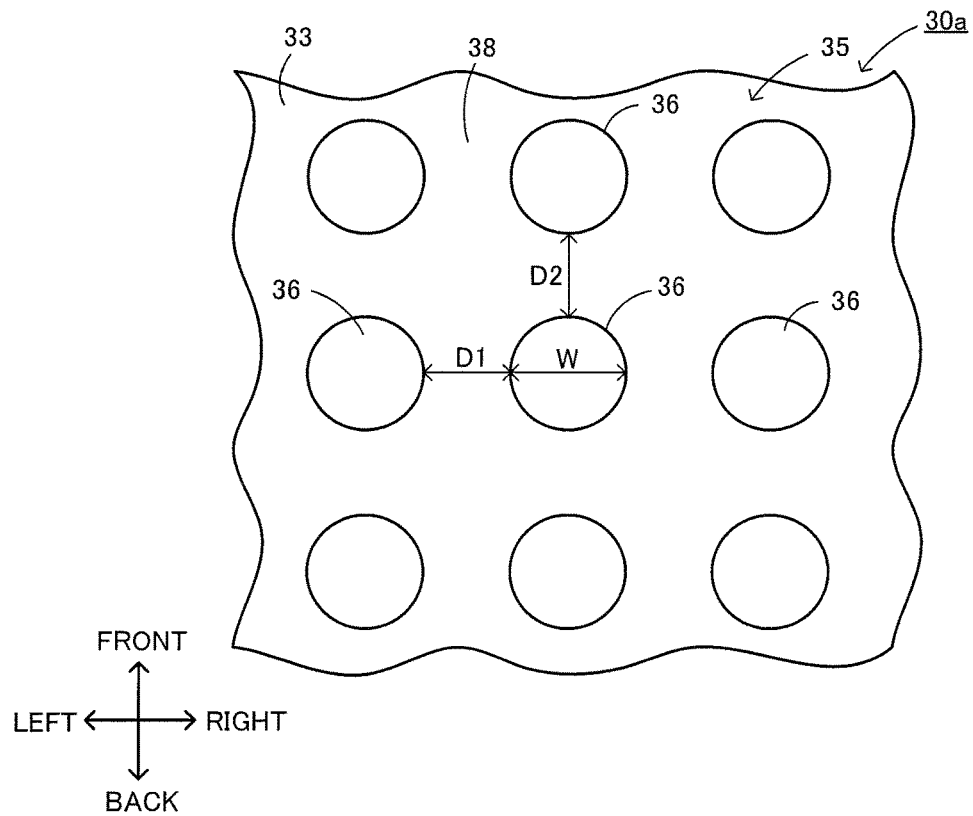
Figure 3:
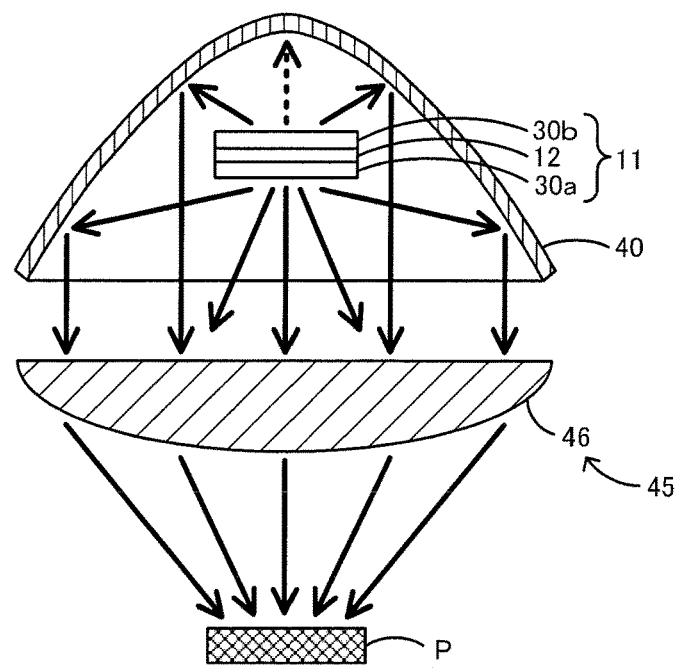
FIG. 3 is a conceptual view illustrating how infrared light from a radiation unit 11 is concentrated onto the object P.

Next, an embodiment of the present invention will be described with reference to the drawings. FIG. 1 is a schematic sectional view of an infrared light radiation device 10 according to the embodiment of the present invention. FIG. 2 is a bottom view of part of a first metamaterial structure 30a. FIG. 3 is a conceptual view illustrating how infrared light from a radiation unit 11 are concentrated. According to the present embodiment, the left-right direction, the front-rear direction, and the up-down direction are as illustrated in FIGS. 1 and 2. The infrared light radiation device 10 includes the radiation unit 11, a reflector 40, a condenser 45, a casing 50, and a securing unit 70. The radiation unit 11, the reflector 40, and the securing unit 70 are disposed in an inner space 53 of the casing 50. The infrared light radiation device 10 radiates infrared light toward an object (for example, an object P illustrated in FIG. 3) disposed therebelow.

The radiation unit 11 is disposed in the inner space 53 of the casing 50. As illustrated in an enlarged part of FIG. 1, the radiation unit 11 includes a heater 12, first and second support substrates 20a, 20b, and first and second metamaterial structures 30a, 30b.

The heater 12 is a so-called planar heater and includes a heater element 13 in which a linear member is bent so as to have a zigzag shape and a protector 14 that is an insulator in contact with the heater element 13 so as to cover a region around the heater element 13. Examples of the material of the heater element 13 include, for example, W, Mo, Ta, an Fe—Cr—Al alloy, an Ni—Cr alloy, and the like. Examples of the material of the protector 14 include, for example, an insulating resin such as polyimide, ceramic, and the like. A pair of electrical wires 15 (only one of the electrical wires 15 is illustrated in FIG. 1) are attached to both ends of the heater element 13. The electrical wires 15 are routed through the reflector 40, a sealing ground 67 attached to an upper portion of the casing 50, and to the outside of the infrared light radiation device 10. Power can be supplied to the heater element 13 from outside through the electrical wires 15. The heater 12 may be a planar heater in which a ribbon-shaped heater element is wound around an insulator. Although the heater 12 has a rectangular shape in top view, the heater 12 may have, for example, a circular shape.

Each of the first and second support substrates 20a, 20b is a flat-plate shaped member. The first support substrate 20a is disposed on or near a first surface (lower surface herein) of the heater 12. The second support substrate 20b is disposed on or near a second surface (upper surface herein) of the heater 12. The first support substrate 20a and the second support substrate 20b are collectively referred to as "support substrates 20". The support substrates 20 support the heater 12 and the first and second metamaterial structures 30a, 30b. Examples of the material of the support substrates 20 include materials such as, for example, an Si wafer and glass smooth surfaces of which are easily maintained, which have high heat resistance and the degree of bending of which due to heat is small. According to the present embodiment, the support substrates 20 are formed of an Si wafer. The first and second support substrates 20a, 20b may be respectively in contact with the lower surface and the upper surface of the heater 12 as in the present embodiment. Alternatively, the first and second support substrates 20a, 20b are not necessarily in contact with the heater 12 and may be respectively disposed below and above the heater 12 with spaces interposed therebetween. When the support substrates 20 and the heater 12 are in contact with one another, the support substrates 20 and the heater 12 may be coupled to one another.

Each of the first and second metamaterial structures 30a, 30b is a flat-plate shaped member. The first metamaterial structure 30a is disposed near the first surface (lower surface herein) of the heater 12 and positioned below the first support substrate 20a. The second metamaterial structure 30b is disposed near the second surface (upper surface herein) of the heater 12 and positioned above the second support substrate 20b. The first metamaterial structure 30a and the second metamaterial structure 30b are collectively referred to as a "metamaterial structure 30". The first metamaterial structure 30a may be directly coupled to a lower surface of the first support substrate 20a or coupled to the lower surface of the first support substrate 20a with an adhesive layer (not illustrated) interposed therebetween. Likewise, the second metamaterial structure 30b may be directly coupled to an upper surface of the second support substrate 20b or coupled to the upper surface of the second support substrate 20b with an adhesive layer (not illustrated) interposed therebetween. The first metamaterial structure 30a mainly downwardly radiates infrared light from a lower surface thereof (an example of a first radiation surface). The second metamaterial structure 30b mainly upwardly radiates infrared light from an upper surface thereof (an example of a second radiation surface). The first metamaterial structure 30a is disposed such that the lower surface thereof faces a condensing lens 46. The second metamaterial structure 30b is disposed such that the upper surface thereof faces the reflector 40. As illustrated in FIG. 1, the first metamaterial structure 30a and the second metamaterial structure 30b include the same elements. According to the present embodiment, the first metamaterial structure 30a and the second metamaterial structure 30b are symmetrically arranged in the up-down direction. Hereinafter, the first metamaterial structure 30a is described. Elements of the second metamaterial structure 30b are denoted by the same reference numerals as those of the elements of the first metamaterial structure 30a in FIG. 1, thereby the detailed description of the second metamaterial structure 30b is omitted.

The first metamaterial structure 30a includes a first conductor layer 31, a dielectric layer 33, and a second conductor layer 35, which includes a plurality of individual conductor layers 36, arranged in this order from a portion near the heater element 13 toward a lower portion of the first metamaterial structure 30a. A structure as described above is also referred to as a metal-insulator-metal (MIM) structure. The layers included in the first metamaterial structure 30a may be directly coupled to one another or coupled to one another with adhesive layers interposed therebetween. The individual conductor layers 36 and exposed portions of a lower surface of the dielectric layer 33 may be coated with an antioxidant layer (not illustrated; formed of, for example, alumina).

The first conductor layer 31 is a flat plate-shaped member coupled to the side opposite the heater element 13 (lower side) relative to the first support substrate 20a. The material of the first conductor layer 31 is a conductor (electrical conductor) such as, for example, metal. Specific examples of the metal include gold, aluminum (Al), molybdenum (Mo), and the like. According to the present embodiment, the first conductor layer 31 is formed of gold. The first conductor layer 31 is coupled to the first support substrate 20a with an adhesive layer (not illustrated) interposed therebetween. Examples of the material of the adhesive layer include, for example, chromium (Cr), titanium (Ti), ruthenium (Ru), and the like. The first conductor layer 31 and the first support substrate 20a may be directly coupled to each other.

The dielectric layer 33 is a flat plate-shaped member coupled to the side opposite the heater element 13 (lower side) relative to the first conductor layer 31. The dielectric layer 33 is interposed between the first conductor layer 31 and the second conductor layer 35. Examples of the material of the dielectric layer 33 include, for example, alumina ($Al_2O_3$), silica ($SiO_2$), and the like. According to the present embodiment, the dielectric layer 33 is formed of alumina.

The second conductor layer 35 is formed of a conductor and has a periodic structure in directions along a lower surface of the dielectric layer 33 (front-rear and left-right directions). Specifically, the second conductor layer 35 includes the individual conductor layers 36 disposed such that the individual conductor layers 36 are spaced from one another in the directions along the lower surface of the dielectric layer 33 (front-rear and left-right directions) so as to form the periodic structure (see FIG. 2). The individual conductor layers 36 are equally spaced from one another by a distance D1 in the left-right direction (first direction). Furthermore, the individual conductor layers 36 are equally spaced from one another by a distance D2 in the front-rear direction (second direction) perpendicular to the left-right direction. Thus, the individual conductor layers 36 are arranged in a lattice pattern. Although the individual conductor layers 36 are arranged in a quadrilateral lattice pattern as illustrated in FIG. 2 according to the present embodiment, the individual conductor layers 36 may be arranged, for example, in a hexagonal lattice pattern in which each of the individual conductor layers 36 is positioned at the vertex of a regular triangle. Each of the individual conductor layers 36 has a circular shape in bottom view and has a cylindrical shape a thickness h (height in the up-down direction) of which is smaller than a diameter W. The periods of the periodic structure of the second conductor layer 35 are as follows: lateral period $\Lambda 1 = D1 + W$; and longitudinal period $\Lambda 2 = D2 + W$. According to the present embodiment, $D1 = D2$, and accordingly, $\Lambda 1 = \Lambda 2$. Examples of the material of the second conductor layer 35 (individual conductor layers 36) include a conductor such as, for example, metal. The material of the second conductor layer 35 may be similar to or the same as the material of the above-described first conductor layer 31. At least one of the first conductor layer 31 and the second conductor layer 35 may be formed of metal. According to the present embodiment, the material of the second conductor layer 35 is the same as the material of the first conductor layer 31, that is, gold.

As described above, the first metamaterial structure 30a includes the first conductor layer 31, the second conductor layer 35 (individual conductor layers 36) having the periodic structure, and the dielectric layer 33 interposed between the first conductor layer 31 and the second conductor layer 35. With this structure, the first metamaterial structure 30a can radiate infrared light having a peak wavelength of a non-Planck distribution when heat energy is input from the heater 12. A Planck distribution is, in a graph the horizontal axis of which represents a wavelength that increases rightward and the vertical axis of which represents emission intensity, an inverted V-shaped distribution that has a specific peak and that is curved such that the inclination is sharp on the left side of the peak and gentle on the right side of the peak. Usual materials radiate in accordance with this curve (Planck radiation curve). A non-Planck radiation (radiation of infrared light having a peak wavelength of a non-Planck distribution) is a radiation in which the inverted V-shaped inclinations on both sides of the maximum peak of the radiation are sharper than those of the Planck radiation. That is, the first metamaterial structure 30a has a radiation characteristic with which the maximum peak is sharper than the peak of the Planck distribution. The term "sharper than the peak of the Planck distribution" means that the "full width at half maximum (FWHM) is smaller than that of the peak of the Planck distribution". Thus, the first metamaterial structure 30a functions as a metamaterial emitter having a characteristic with which infrared light of a specific wavelength out of the entire wavelength region of the infrared light (0.7 to 1000 μm) is selectively radiated. It is conceivable that this characteristic is caused by a resonant phenomenon explained by magnetic polariton. The magnetic polariton refers to a resonant phenomenon with which a confinement effect of a strong magnetic field is obtained in a dielectric (dielectric layer 33) between two conductors arranged in the up-down direction (the first conductor layer 31 and the second conductor layer 35) when anti-parallel currents are excited at these two conductors. Accordingly, in the first metamaterial structure 30a, since strong oscillation of an electric field is locally excited at the first conductor layer 31 and the individual conductor layers 36, these become sources of radiation of infrared light and the infrared light is radiated to a surrounding environment (especially downward herein). Furthermore, with the first metamaterial structure 30a, the wavelength of the oscillation can be adjusted by adjusting the material of the first conductor layer 31, the dielectric layer 33, or the second conductor layer 35 or adjusting the shape or the periodic structure of the individual conductor layers 36. Thus, the infrared light radiated from the first conductor layer 31 and the individual conductor layers 36 of the first metamaterial structure 30a exhibits the characteristic with which the emissivity of the infrared light of a specific wavelength is increased. That is, the first metamaterial structure 30a has the characteristic with which the infrared light of a sharp maximum peak having a comparatively small FWHM and a comparatively high emissivity are radiated. Although D1=D2 according to the present embodiment, the distance D1 may be different from the distance D2. Likewise, the period Λ1 may be different from the period Λ2. The FWHM can be controlled by changing the period Λ1 and the period Λ2. With the first metamaterial structure 30a, the above-described maximum peak of a predetermined radiation characteristic may exist in a wavelength range from 6 to 7 μm or in a wavelength range from 2.5 to 3.5 μm. It is preferable that, with the first metamaterial structure 30a, the value of the emissivity of the infrared light in wavelength regions other than the wavelength region from the rise to fall of the maximum peak be 0.2 or smaller. It is preferable that, with the first metamaterial structure 30a, the FWHM of the maximum peak be 1.0 μm or smaller. The radiation characteristic of the first metamaterial structure 30a may be substantially symmetric in the left-right direction about the maximum peak. The height of the maximum peak (maximum emission intensity) with the first metamaterial structure 30a does not exceed the above-described curve of the Planck radiation.

The first metamaterial structure 30a as described above can be formed, for example, as follows. First, the adhesive layer and the first conductor layer 31 are formed in this order on the surface (lower surface in FIG. 1) of the first support substrate 20a by sputtering. Next, the dielectric layer 33 is formed on the surface (lower surface in FIG. 1) of the first conductor layer 31 by atomic layer deposition (ALD). Next, a predetermined resist pattern is formed on the surface (lower surface in FIG. 1) of the dielectric layer 33, and then, a layer formed of the material of the second conductor layer 35 is formed on this surface of the dielectric layer 33 by helicon sputtering. Then, the second conductor layer 35 (individual conductor layers 36) is formed by removing the resist pattern.

The above-described radiation characteristics of the infrared light of the first and second metamaterial structures 30a, 30b may be the same as or close to each other. For example, the maximum peak of the infrared light radiated by the second metamaterial structure 30b may be the same as or close to the maximum peak of the infrared light radiated by the first metamaterial structure 30a. Specifically, the difference in wavelength of the maximum peak between the infrared light radiated by the first metamaterial structure 30a and the infrared light radiated by the second metamaterial structure 30b may be 0.5 μm or smaller. Furthermore, the wavelength regions of the FWHM (FWHM regions) of the maximum peaks of the first and second metamaterial structures 30a, 30b may at least partially overlap each other. A half or more of the FWHM region of the maximum peak of the first metamaterial structure 30a may overlap that of the second metamaterial structure 30b, or vice versa. According to the present embodiment, the first and second metamaterial structures 30a, 30b are the same in D1, D2, and W and substantially the same in radiation characteristic of the infrared light described above.

The reflector 40 reflects the infrared light radiated from the radiation unit 11 toward a condenser 45. The reflector 40 partially covers a region around the radiation unit 11 from outside without blocking infrared light directed from the radiation unit 11 directly toward the condenser 45. Specifically, the reflector 40 is disposed in the inner space 53 and covers a region opposite the condenser 45 relative to the radiation unit 11 (upper region herein). The reflector 40 also covers front, rear, left, and right portions of the radiation unit 11. Furthermore, a lower end portion of the reflector 40 extends further toward the condenser 45 (downward, herein) than the radiation unit 11 so as to cover a region diagonally below the radiation unit 11. Thus, the radiation unit 11 is positioned inside the reflector 40. An inner surface of the reflector 40 (surface near the radiation unit 11) has a parabolic shape in section, and this surface serves as a reflection surface of the infrared light. The reflector 40 has a circular shape in top view and rotation symmetric about the axis parallel to the up-down direction. Accordingly, the shape of any section of the reflector 40 passing through this axis is substantially the same. In top view, the diameter of the reflection surface of the reflector 40 is larger than the dimensions of the first and second radiation surfaces of the metamaterial structure 30 in the front-rear direction and in the left-right direction. Accordingly, the radiation unit 11 is disposed inside the reflector 40 in top view. According to the present embodiment, the center of the second radiation surface of the second metamaterial structure 30b in the front-rear direction and in the left-right direction is positioned at a focal point of the reflection surface of the reflector 40. However, the center of the first radiation surface of the first metamaterial structure 30a in the front-rear direction and in the left-right direction or the center of the entire radiation unit 11 in the front-rear direction, in the left-right direction, and in the up-down direction may be positioned at the focal point of the reflection surface of the reflector 40. The sectional shape of the reflection surface of the reflector 40 is not limited to the parabolic shape and may be another curved shape such as an arc of an ellipse or an arc of a circle.

The reflector 40 can at least reflect infrared light of a wavelength region including the maximum peak out of the infrared light radiated from the first metamaterial structure 30a and can at least reflect infrared light of a wavelength region including the maximum peak out of the infrared light radiated from the second metamaterial structure 30b. Preferably, the reflector 40 can at least reflect infrared light of a wavelength region including the FWHM region of the maximum peak out of the infrared light radiated from the first metamaterial structure 30a and can at least reflect infrared light of a wavelength region including the FWHM region of the maximum peak out of the infrared light radiated from the second metamaterial structure 30b. Examples of the material of the reflector 40 include, for example, metal such as SUS304 and aluminum. The reflection surface of the reflector 40 may be polished, for example, buffed so as to improve the reflection coefficient. A reflection layer formed of a material reflecting the infrared light such as gold, platinum, or aluminum may be formed on the reflection surface of the reflector 40. According to the present embodiment, the main body of the reflector 40 is formed of a glass substrate, and an aluminum reflection layer is formed on the reflection surface by, for example, sputtering.

The condenser 45 concentrates and radiates the infrared light to the outside (downward, herein) the infrared light radiated from the radiation unit 11 (including the infrared light reflected by the reflector 40). The condenser 45 includes one or more condensing lenses 46 (a single condensing lens 46 herein), which concentrates and transmits the infrared light. The condensing lens 46 is a planoconvex lens having an upper flat surface and a lower convex surface. The diameter of the condensing lens 46 is larger than the dimensions of the first and second radiation surfaces of the metamaterial structure 30 in the front-rear direction and the left-right direction. Accordingly, the radiation unit 11 is disposed inside the condensing lens 46 in top view. According to the present embodiment, the diameter of the condensing lens 46 is 150 mm and the thickness of the condensing lens 46 at the center is 40 mm. The condenser 45 is positioned below the radiation unit 11 and the reflector 40. Accordingly, the reflector 40, the second metamaterial structure 30b, the heater 12, the first metamaterial structure 30a, and the condenser 45 are arranged in this order from an upper portion to a lower portion of the infrared light radiation device 10. Furthermore, the axes of these components extending in the up-down direction are coincident with one another. The condensing lens 46 is disposed at an opening at a lower end of the casing 50 and functions as a window that transmits the infrared light from the metamaterial structure 30 to the outside of the casing 50.

The condensing lens 46 can transmits infrared light of at least part of the wavelength region from the rise to the fall of the maximum peak out of the infrared light radiated from each of the first and second metamaterial structures 30a, 30b. Preferably, the condensing lens 46 can at least transmit infrared light in the wavelength region including the maximum peak out of the infrared light radiated from the first and second metamaterial structures 30a, 30b. More preferably, the condensing lens 46 can at least transmit infrared light in the wavelength region including the FWHM region of the maximum peak out of the infrared light radiated from the first and second metamaterial structures 30a, 30b. Examples of the material of the condensing lens 46 include infrared-transparent materials such as, for example, silica glass (transmitting infrared light of 3.5 µm or smaller in wavelength), transparent alumina (transmitting infrared light of 5.5 µm or smaller in wavelength), fluorite (calcium fluoride, $CaF_2$, transmitting infrared light of 8 µm or smaller in wavelength), magnesium fluoride (transmitting infrared light of 7 µm or smaller in wavelength), barium fluoride (transmitting infrared light of 12 µm or smaller in wavelength), and zinc selenide (ZnSe, transmitting infrared light of 18 µm or smaller in wavelength). The material of the condensing lens 46 may be appropriately selected in accordance with, for example, the maximum peak of the infrared light from the metamaterial structure 30. According to the present embodiment, the material of the condensing lens 46 is calcium fluoride.

The casing 50 includes a cylindrical unit 52, a lens support 54, clamping members 55, 56, and plate-shaped members 57, 58. The axial direction of the cylindrical unit 52 extends in the up-down direction. An upper end and a lower end of the cylindrical unit 52 are open. The lens support 54 has a hole at its center. The condensing lens 46 is inserted into this hole of the lens support 54. The condensing lens 46 and the lens support 54 are bonded to each other without clearance. The lens support 54 and the condensing lens 46 close the opening at the lower end of the cylindrical unit 52. The casing 50 has the inner space 53 surrounded by the cylindrical unit 52, the lens support 54, the condensing lens 46, and the plate-shaped member 57. The clamping members 55, 56 are plate-shaped members having respective circular openings in top view and clamp the lens support 54 at a region outside the cylindrical unit 52 from above and below so as to secured the lens support 54 and the condensing lens 46. Sealing members 63, 64 such as, for example, O-rings are disposed between the lens support 54 and the clamping members 55, 56 so as to seal gaps between the inner space 53 and the outside of the casing 50. The clamping members 55, 56 are pressed and secured so as to be close to each other in the up-down direction by a plurality of securing metal members 61 such as bolts (only two of the securing metal members 61 are illustrated in FIG. 1). The plate-shaped members 57, 58 are plate-shaped members having a circular shape in top view. The plate-shaped member 57 is disposed so as to close the opening at the upper end of the cylindrical unit 52. The plate-shaped member 58 has an opening having a circular shape in top view, and the upper end of the cylindrical unit 52 is inserted into this opening. A sealing member 65 such as, for example, an O-ring is disposed between the plate-shaped members 57, 58. The plate-shaped members 57, 58 are pressed and secured so as to be close to each other in the up-down direction by a plurality of securing metal members 62 (only two of the securing metal members 62 are illustrated in FIG. 1). The securing metal members 62 each include, for example, a bolt and nut or the like. The materials of the cylindrical unit 52, the clamping members 55, 56, and the plate-shaped members 57, 58 are, for example, stainless steel, aluminum or the like.

A pipe 66 and the sealing ground 67 are attached to an upper portion of the casing 50. The inside of the pipe 66 communicates with the inner space 53 through a through hole formed in the plate-shaped member 57. A vacuum gage 81 and a vacuum pump (not illustrated) are connected to the pipe 66. The pressure of the inner space 53 can be reduced by operating the vacuum pump. The electrical wires 15 are routed through the sealing ground 67, thereby the inner space 53 is sealed from an outer space, and the electrical wires 15 of the heater element 13 are routed to the outside.

The securing unit 70 supports the radiation unit 11 and the reflector 40 in the inner space 53. The securing unit 70 includes a plurality of pairs of nuts 71, 72, a plurality of guide shafts 73, a radiation-unit support member 74, a support plate 75, and a securing metal member 76. The radiation-unit support member 74 is a plate-shaped member having a hole at its center. The radiation unit 11 is inserted into and bonded to this hole of the radiation-unit support member 74. The radiation unit 11 is supported by using the radiation-unit support member 74. Each of the nuts 71 and a corresponding one of the nuts 72 form a pair so as to clamp the radiation-unit support member 74 from above and below. The securing unit 70 includes the plurality of pairs of nuts 71, 72 (for example, four pairs; only two pairs are illustrated in FIG. 1). The guide shafts 73 are rod-shaped members inserted through the nuts 71, 72, the radiation-unit support member 74 and the reflector 40 so as to support these. The number of the guide shafts 73 are the same as the number of the nuts 71 and the nuts 72 (four of the guide shafts 73 are provided according to the present embodiment, and only two of the guide shafts 73 are illustrated in FIG. 1). The guide shafts 73 are attached to and secured to the plate-shaped member 57 by using the support plate 75 and the securing metal member 76 inserted through the support plate 75. With this structure, the radiation unit 11 and the reflector 40 are supported by the securing unit 70 while being spaced from the casing 50. Furthermore, a male thread is formed in each of the guide shafts 73. Thus, the positions of the nuts 71, 72 in the up-down direction can be changed along the guide shafts 73. This allows the position of the radiation unit 11 in the up-down direction (for example, the distances from the reflector 40 and the condenser 45) to be changed.

Hereinafter, examples of use of such an infrared light radiation device 10 are described. First, the atmosphere of the inner space 53 is set into a predetermined pressure reduced atmosphere by using the vacuum pump (not illustrated). The atmosphere of the inner space 53 may be set into an air atmosphere or an inert gas atmosphere (for example, a nitrogen atmosphere). The pressure of the inner space 53 after the pressure reduction may be 100 Pa or smaller or a vacuum state (1 Pa or smaller). The pressure of the inner space 53 after the pressure reduction may be 0.01 Pa or larger. Furthermore, power is supplied to the heater element 13 from a power source (not illustrated) through the electrical wires 15. The power is supplied so that, for example, the temperature of the heater element 13 becomes a preset temperature (for example, 400° C. herein). The heater element 13 having reached the predetermined temperature transfers energy to the surrounding region mainly in the form of conduction out of three heat transfer forms including conduction, convection, and radiation, thereby the metamaterial structure 30 is heated. As a result, the temperature of the metamaterial structure 30 increases to a predetermined temperature (for example, 390° C. herein), and the metamaterial structure 30 becomes a radiator to radiate the infrared light. At this time, since the metamaterial structure 30 includes the first conductor layers 31, the dielectric layers 33, and the second conductor layers 35 as described above, the radiation unit 11 radiates the infrared light having a peak wavelength of the non-Planck distribution. More specifically, the radiation unit 11 selectively radiates the infrared light of a specified wavelength region from the first conductor layers 31 and the individual conductor layers 36 of the metamaterial structure 30, that is, from the first and second radiation surfaces of the first metamaterial structure 30*a* and the second metamaterial structure 30*b*.

The infrared light of the specified wavelength region is described in detail below from the radiation from the metamaterial structures to arrival at the object. FIG. 3 is a conceptual view illustrating how the infrared light from the radiation unit 11 is concentrated onto the object P. Arrows in FIG. 3 indicate directions in which the infrared light is radiated. As illustrated in FIG. 3, part of the infrared light radiated from the first radiation surface (lower surface herein) of the first metamaterial structure 30*a* is directed to the condensing lens 46 disposed immediately below the first metamaterial structure 30*a*, and another part of the infrared light is reflected by the reflector 40, and then, directed toward the condensing lens 46. The infrared light radiated from the second radiation surface (upper surface herein) of the second metamaterial structure 30*b* is mainly reflected by the reflector 40 above the radiation unit 11, and then, directed to the condensing lens 46. Thus, most of the infrared light radiated from the first and second metamaterial structures 30*a*, 30*b* is directed to the condensing lens 46, concentrated by the condensing lens 46, and reaches the object P below the condensing lens 46. Thus, the infrared light radiated from the first and second metamaterial structures 30*a*, 30*b* can be radiated to the object P in a concentrated manner and radiated to the object P efficiently. Furthermore, the metamaterial structure 30 selectively radiates the infrared light of the specific wavelength region. Accordingly, for example, an infrared radiation process such as a drying process or a process through which the object is subjected to chemical reaction can be efficiently performed on the object P that exhibits a comparatively high absorptance for the infrared light of this specified wavelength region. The infrared light radiated from a region near the center of the second radiation surface (see a broken-line arrow in FIG. 3) is, even when reflected by the reflector 40, returns to the radiation unit 11 in some cases instead of reaching the condensing lens 46. However, such infrared light is not wasted. Such infrared light is absorbed by the radiation unit 11 so as to be utilized as energy to heat the radiation unit 11, thereby a corresponding amount of the power supplied to the heater element 13 can be reduced.

The infrared light reflected by the reflector 40 is illustrated as substantially collimated light in FIG. 3. However, since the first radiation surface and the second radiation surface are actually planar (not a linear or point radiation source), some of rays of the reflected infrared light are not included in the collimated light. These non-collimated rays of the infrared light do not completely converge at the focal point of the condensing lens 46 (focal point of the collimated light incident upon the condensing lens 46). However, these non-collimated rays of the infrared light are at least concentrated by the condenser 45. Thus, the non-collimated rays can sufficiently reach the object P when the object P has a certain degree of size. The distance between the condensing lens 46 and the object P may be appropriately adjusted in accordance with the size of the object P so as to increase the amount of the infrared light transmitted through the condensing lens 46 to reach the object P.

Here, as a comparative example, a case where the condensing lens 46 is not provided in FIG. 3 is discussed. In this case, the infrared light radiated from the first radiation surface of the first metamaterial structure 30*a* diverges in the front-rear direction and the left-right direction. Furthermore, the infrared light radiated from the second radiation surface of the second metamaterial structure 30*b* can be collimated by the reflector 40 but cannot be concentrated. Thus, without the condensing lens 46, only very small part of the infrared light is radiated to the object P compared to the present embodiment. This reduces efficiency (ratio of energy supplied to the object P to the power supplied to the heater 12). According to the present embodiment, the condensing lens 46 is used to concentrate the infrared light. Thus, the infrared light can be efficiently radiated to the object P.

Even when the condensing lens 46 is not provided, the efficiency can be increased to some degree by reducing the distance between the radiation unit 11 and the object P. In this case, however, heat transfer due to convection from the infrared light radiation device 10 (in particular, the radiation unit 11 and the casing 50) increases because of the reduction in distance. Accordingly, the object P is likely to be heated.

Thus, the reduction in distance between the radiation unit 11 and the object P is not suitable particularly for the case where infrared light of a specific wavelength region is wished to be radiated to the object P without heating the object P. In contrast, according to the present embodiment, the infrared light is concentrated by the condensing lens 46. Thus, heating of the object P can be suppressed by increasing the distance from the infrared light radiation device 10 and the infrared light can be efficiently radiated to the object P. When heating of the object P is wished to be suppressed as much as possible as described above, it is preferable that the focal length (focal length when collimated light is incident from a side at which the radiation unit 11 is disposed) of the condensing lens 46 be increased. For example, it is preferable that the focal length of the condensing lens 46 be 100 mm or larger.

Furthermore, it is also conceivable that, in the case where the condensing lens 46 is not provided, the reflected light is concentrated into as small a region as possible by improving the shape of the reflector 40, for example, increasing the length of the reflector 40 in the up-down direction and reducing the diameter of the opening at the lower end of the reflector 40. In this case, however, it is difficult to concentrate the infrared light into a region having a smaller area than the area of the first or second radiation surface of the radiation unit 11. In contrast, according to the present embodiment, the infrared light can be concentrated into a region having a smaller area than the area of the first or second radiation surface by using the condensing lens 46. Accordingly, for example, even when the area of the object P (for example, the area of an upper surface of the object P) to which the infrared light is to be radiated is smaller than the area of the first radiation surface or the second radiation surface, the infrared light radiation device 10 according to the present embodiment can efficiently radiate the infrared light to the object P.

With the infrared light radiation device 10 according to the present embodiment having been described in detail, the infrared light having a peak wavelength of the non-Planck distribution is radiated from the metamaterial structure 30. In other words, the infrared light of a specific wavelength region is selectively radiated from the metamaterial structure 30. The radiated infrared light is concentrated by the condenser 45 and radiated toward the outside. Accordingly, the infrared light radiation device 10 can radiate the infrared light radiated from the metamaterial structure 30 toward the object in a concentrated manner.

The infrared light radiation device 10 includes the reflector 40 that reflects the infrared light radiated from the radiation unit 11 to the condenser 45. Thus, at least part of the infrared light not directly radiated to the condenser 45 from the radiation unit 11 can also be radiated toward the condenser 45 by reflection. Accordingly, the infrared light radiation device 10 can efficiently radiate the infrared light to the object.

Furthermore, the metamaterial structure 30 includes the first metamaterial structure 30a and the second metamaterial structure 30b. The first metamaterial structure 30a radiates the infrared light from the first radiation surface. The second metamaterial structure 30b radiates the infrared light from the second radiation surface. The reflector 40, the second metamaterial structure 30b, the heater 12, the first metamaterial structure 30a, and the condenser 45 are arranged in this order. Thus, the radiation unit 11 can selectively radiate the infrared light of the specific wavelength region from both sides (the upper side and the lower side herein). Accordingly, compared to the case where, for example, the radiation unit 11 includes only one of the first metamaterial structure 30a and the second metamaterial structure 30b, radiation of, from the radiation unit 11, infrared light of unnecessary wavelengths not included in the specific wavelength region can be suppressed. This can suppress, for example, the following situation: when the second metamaterial structure 30b is not provided, the infrared light of unnecessary wavelengths not included in the specific wavelength region is likely to be radiated from the upper surface of the radiation unit 11. Furthermore, the first and second metamaterial structures 30a, 30b are interposed between the reflector 40 and the condenser 45 in the up-down direction. Thus, the infrared light radiated from both the first and second radiation surfaces is likely to reach the condenser 45 directly or through the reflector 40. Accordingly, the infrared light radiation device 10 can efficiently radiate the infrared light to the object.

Furthermore, the reflector 40 covers a region opposite the condenser 45 (upper region herein) relative to the radiation unit 11, and the end portion (lower end portion herein) of the reflector 40 extends further toward the condenser 45 (downward herein) than the radiation unit 11. Thus, the radiation unit 11 is positioned inside the reflector 40. Thus, the infrared light radiation device 10 can reduce the amount of the infrared light that is directed toward neither the condenser 45 nor the reflector 40 and that does not reach the object. Accordingly, the infrared light radiation device 10 can efficiently radiate the infrared light to the object.

When the focal length of the condensing lens 46 is 100 mm or larger, for example, the object can be disposed at or near the focal point of the condenser 45. Thus, an increase in temperature of the object due to, for example, heat transfer caused by convection can be suppressed by sufficiently increasing the distance between the object and the radiation unit 11, and the infrared light can be radiated toward the object in a concentrated manner. Accordingly, the infrared light radiation device 10 can appropriately radiate the infrared light toward the object on which, for example, it is wished to perform a process using the infrared light while suppressing heating of the object as much as possible.

The present invention is in no way limited to the above-described embodiment and can be embodied in a variety of forms within the technical scope of the present invention.

Figure 4:
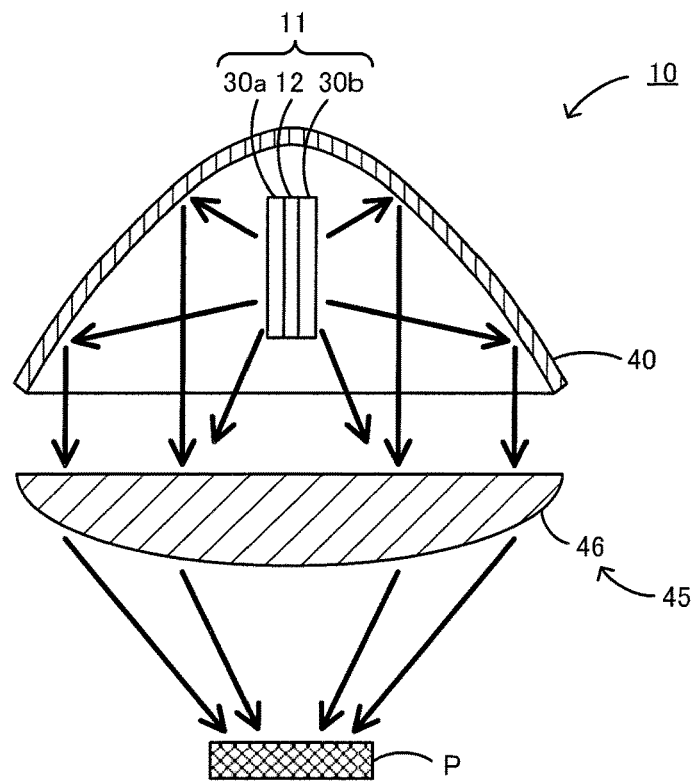
FIG. 4 is a schematic view of the infrared light radiation device 10 according to a variant.

For example, although the reflector 40, the second metamaterial structure 30b, the heater 12, the first metamaterial structure 30a, and the condenser 45 are arranged in this order from the upper portion to the lower portion of the infrared light radiation device 10 according to the above-described embodiment, this is not limiting. For example, as is the case with the infrared light radiation device 10 according to a variant illustrated in FIG. 4, the first metamaterial structure 30a, the heater 12, and the second metamaterial structure 30b may be arranged in this order in a direction (left-right direction herein) perpendicular to a direction in which the radiation unit 11 and the condenser 45 are arranged (up-down direction herein). Also in this case, when the first and second metamaterial structures 30a, 30b are interposed between both sides of the reflector 40 as illustrated in FIG. 4, the infrared light radiated from both the first and second radiation surfaces is likely to reach the condenser 45 directly or through the reflector 40 (see arrows in FIG. 4). Accordingly, also with the infrared light radiation device 10 illustrated in FIG. 4, the infrared light can be efficiently radiated to the object P. Furthermore, the infrared light radiation device 10 illustrated in FIG. 4 can reduce the amount of the infrared light such as a ray of the infrared light indicated by a broken line in FIG. 3 that, after being reflected by the reflector 40, returns to the radiation unit 11 instead of reaching the condensing lens 46. Thus, the infrared light can be efficiently radiated to the object P. Arrangement of the reflector 40 is not limited to the arrangement illustrated in FIG. 4. It is sufficient that the first and second metamaterial structures 30a, 30b be interposed between both the sides of the reflector 40. For example, instead of the reflector 40, independent reflectors may be disposed on the left and right sides of the radiation unit 11. The reflector 40 does not necessarily cover the region above the radiation unit 11. For example, the reflector 40 illustrated in FIG. 4 does not necessarily have a portion directly above the radiation unit 11. The reflector 40 may cover only the left and right portions of the radiation unit 11, or only the front, rear, left, and right portions of the radiation unit 11.

Figure 5:
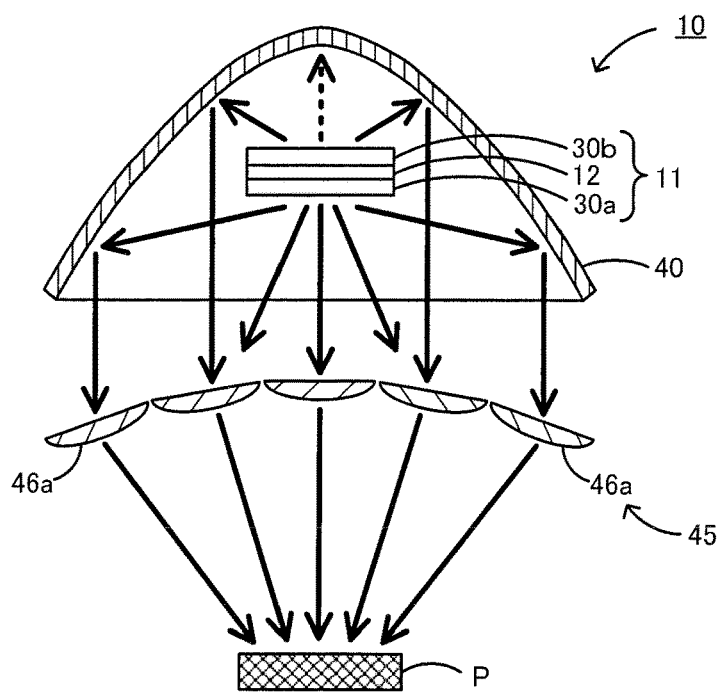
FIG. 5 is a schematic view of the infrared light radiation device 10 according to a variant.

Although the condenser 45 includes a single condensing lens 46 according to the above-described embodiment, the condenser 45 may include a plurality of condensing lenses 46a as illustrated in FIG. 5. In the infrared light radiation device 10 according to a variant illustrated in FIG. 5, the condensing lenses 46a are disposed such that the condensing lenses 46a are inclined more and the located at lower positions as the distance from a central axis parallel to the up-down direction increases. Generally, the condensing lenses 46a are arranged upwardly convexly. Furthermore, in top view, the condensing lenses 46a are concentrically arranged around the condensing lenses 46a positioned at the central axis parallel to the up-down direction. Thus, even when the condensing lenses 46a are used, the infrared light can be concentrated by the condenser 45 similarly to the above-described embodiment.

Figure 6:
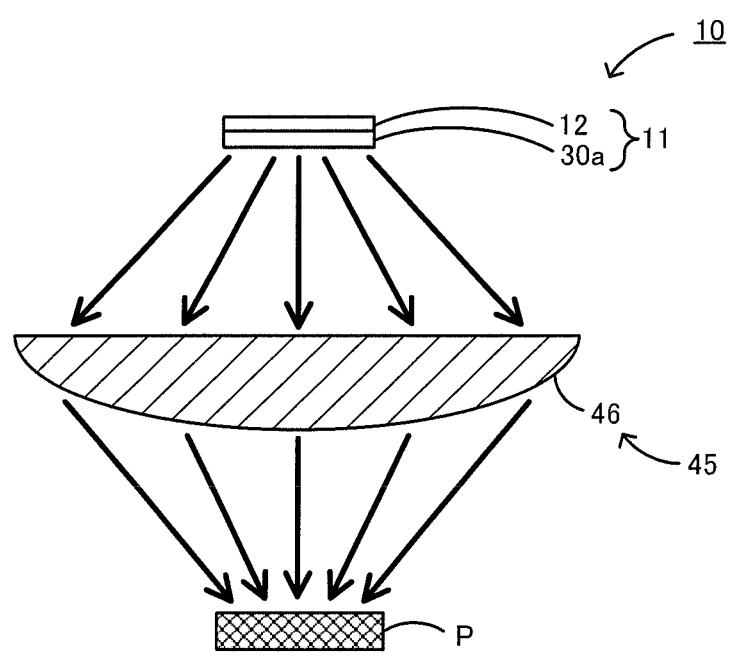
FIG. 6 is a schematic view of the infrared light radiation device 10 according to a variant.

Although the infrared light radiation device 10 includes the reflector 40 according to the above-described embodiment, the reflector 40 may be omitted as illustrated in FIG. 6. In this case, as illustrated in FIG. 6, the second metamaterial structure 30b of the radiation unit 11 can also be omitted. Also with the infrared light radiation device 10 according to a variant illustrated in FIG. 6, the infrared light from the first metamaterial structure 30a can be radiated toward the object P in a concentrated manner by concentrating the infrared light with the condenser 45.

For the above-described embodiment, either the first metamaterial structure 30a or the second metamaterial structure 30b may be omitted. For example, referring to FIG. 3, even when the first metamaterial structure 30a is omitted from the infrared light radiation device 10, the infrared light from the second metamaterial structure 30b can be reflected by the reflector 40, and the reflected infrared light can be concentrated by the condenser 45, thereby the infrared light can be radiated to the object P.

Although the condensing lens 46 is a planoconvex lens having an upper flat surface and a lower convex surface according to the above-described embodiment, this is not limiting. For example, the condensing lens 46 may be a planoconvex lens having an upper convex surface and a lower flat surface or a biconvex lens that is convex on both surfaces. The condensing lens 46 is not limited to a convex lens. It is sufficient that the condensing lens 46 have a curved surface with which the condensing lens 46 concentrates due to refraction and transmits to the outside the infrared light.

Although the lower end portion of the reflector 40 extends further toward the condenser 45 than the radiation unit 11 according to the above-described embodiment, this is not limiting. For example, the reflector 40 may cover only the region opposite the condenser 45 relative to the radiation unit 11 (upper region in FIG. 1).

Although the pressure of the inner space 53 of the casing 50 is reduced according to the above-described embodiment, this in not limiting. The pressure of the inner space 53 is not necessarily reduced. Furthermore, the infrared light radiation device 10 does not necessarily include the casing 50. In this case, the radiation unit 11, the reflector 40, the condenser 45, and so forth may be exposed to an outside space. Also in this case, a region around the radiation unit 11 (outside space) is in a non-pressure reduced environment such as the atmosphere.

According to the above-described embodiment, in using the infrared light radiation device 10, the inner space 53 is set into the pressure-reduced atmosphere by using the vacuum pump through the pipe 66 attached to the casing 50. However, this is not limiting. For example, during the manufacture of the infrared light radiation device 10, the inner space 53 may be sealed from the outside space with the inner space 53 set into the pressure-reduced atmosphere. In this case, the pipe 66 is not necessarily attached to the casing 50.

Figure 7:
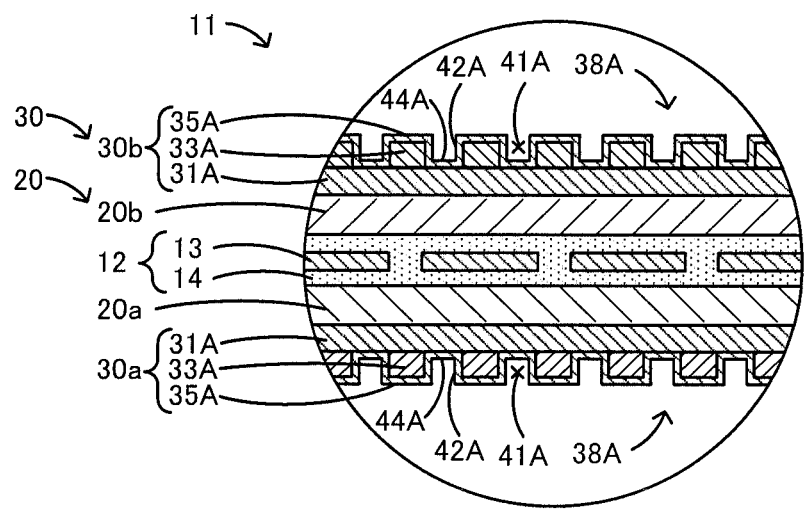
FIG. 7 is a sectional view of part of the radiation unit 11 according to a variant.
Figure 8:
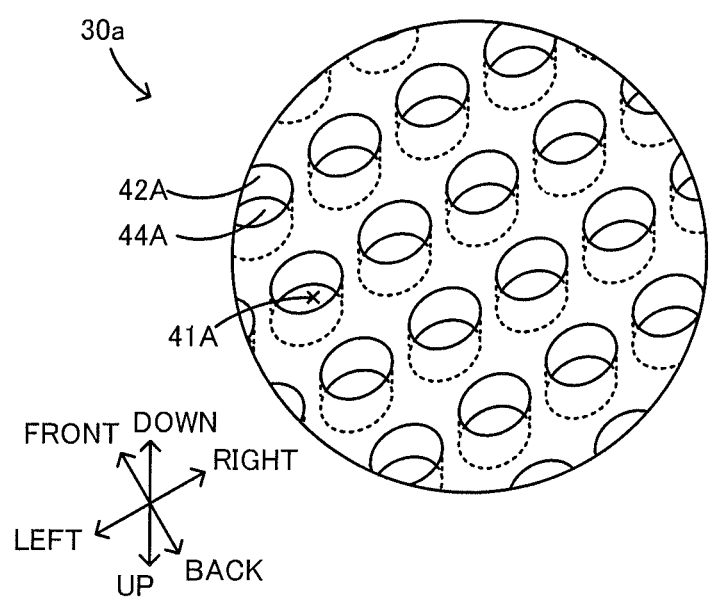
FIG. 8 is a bottom perspective view of part of the first metamaterial structure 30a according to the variant.

The metamaterial structure 30 includes, for example, at least one first conductor layer 31, at least one dielectric layer 33, and at least one second conductor layer 35, that is, the MIM structure, according the above-described embodiment. However, this is not limiting. It is sufficient that the metamaterial structure 30 be able to radiate the infrared light having a peak wavelength of a non-Planck distribution when heat energy is input from the heater 12. For example, the metamaterial structure may be a micro-cavity forming body having a plurality of micro-cavities. FIG. 7 is a sectional view of part of the radiation unit 11 according to a variant. FIG. 8 is a bottom perspective view of part of the first metamaterial structure 30a according to the variant. Each of the first and second metamaterial structures 30a, 30b of the radiation unit 11 according to the variant has a plurality of micro-cavities 41A. At least surfaces (side surfaces 42A and bottom surfaces 44A herein) of the micro-cavities 41A are formed of a conductor layer 35A. The micro-cavities 41A form a periodic structure in the front-rear direction and the left-right direction. One of radiation surfaces 38A that is the lower surface of the first metamaterial structure 30a is the first radiation surface, and the other radiation surface 38A that is the upper surface of the second metamaterial structure 30b is the second radiation surface. The first metamaterial structure 30a and the second metamaterial structure 30b include the same elements and are symmetrically arranged in the up-down direction. Accordingly, the first metamaterial structure 30a is described in detail. Elements of the second metamaterial structure 30b are denoted by the same reference numerals as those of the first metamaterial structure 30a in FIG. 7, thereby the detailed description of the second metamaterial structure 30b is omitted. The first metamaterial structure 30a includes a main body layer 31A, a recess forming layer 33A, and the conductor layer 35A arranged in this order from the heater 12 of the radiation unit 11 or a portion thereof near the heater 12 toward a lower portion thereof. The main body layer 31A is formed of, for example, a glass substrate or the like. The recess forming layer 33A is formed of, for example, an inorganic material such as, for example, resin, ceramic, or glass. The recess forming layer 33A is formed on a lower surface of the main body layer 31A, thereby forming cylindrical recesses. The material of the recess forming layer 33A may be the same as the material of the second conductor layer 35. The conductor layer 35A is disposed on the surface (lower surface) of the first metamaterial structure 30a and covers the surfaces (lower surfaces and the side surfaces) of the recess forming layer 33A and a lower surface of the main body layer 31A (portions where the recess forming layer 33A is not disposed). The conductor layer 35A is formed of a conductor. Examples of the material of the conductor layer 35A include, for example, metal such as gold and nickel and conductive resin. Each of the micro-cavities 41A is a substantially cylindrical space surrounded by a corresponding one of the side surface 42A (a portion covering a side surface of the recess forming layer 33A) of the conductor layer 35A and a corresponding one of the bottom surfaces 44A (a portion covering the lower surface of the main body layer 31A) and open at the bottom. As illustrated in FIG. 8, the micro-cavities 41A are arranged in the front-rear direction and the left-right direction. The lower surface of the first metamaterial structure 30a is the radiation surface 38A for radiation of the infrared light to the object. Specifically, when the first metamaterial structure 30a absorbs energy from the heater 12, the infrared light of a specific wavelength is strongly radiated from the radiation surface 38A toward the object disposed below due to resonance between an incident wave and a reflected wave in a space formed by the bottom surface 44A and the side surface 42A. Thus, the first metamaterial structure 30a can radiate infrared light having a peak wavelength of a non-Planck distribution. The radiation characteristic of the first metamaterial structure 30a can be adjusted by adjusting the diameter and the depth of the cylinder of each of the micro-cavities 41A. The shape of the micro-cavities 41A is not limited to the cylindrical shape. The micro-cavities 41A may have a polygonal prism shape. The depth of the micro-cavities 41A may be, for example, 1.5 to 10 μm. The first metamaterial structure 30a as illustrated in FIGS. 7 and 8 can be formed, for example, as follows. First, the recess forming layer 33A is formed in a portion that is to become the lower surface of the main body layer 31A through a known nanoimprinting process. Then, the conductor layer 35A is formed by, for example, sputtering so as to cover the surface of the recess forming layer 33A and the surface of the main body layer 31A. Here, a structure in which one and the other of the first metamaterial structure 30a and the second metamaterial structure 30b respectively have the MIM structure and the micro-cavities is possible.

The present application claims priority on the basis of the Japanese Patent Application No. 2018-190005 filed on Oct. 5, 2018, the entire contents of which are incorporated herein by reference.

What is claimed is:
1. An infrared light radiation device comprising:
a radiation unit that includes
a heater, and
a metamaterial structure that is able to radiate, when heat energy is input from the heater, infrared light having a peak wavelength of a non-Planck distribution; and
a condenser that includes at least one condensing lens that concentrates transmits toward outside the infrared light radiated from the radiation unit; and
a reflector that reflects to the condenser the infrared light radiated from the radiation unit;
wherein the metamaterial structure includes
a first metamaterial structure that radiates the infrared light from a first radiation surface, and
a second metamaterial structure that radiates the infrared light from a second radiation surface,
wherein the first metamaterial structure, the heater, and the second metamaterial structure are arranged in this order in a direction perpendicular to a direction in which the radiation unit and the condenser are arranged, and
wherein the first metamaterial structure and the second metamaterial structure are interposed between one and another sides of the reflector.

2. The infrared light radiation device according to claim 1,
wherein the reflector covers a region opposite the condenser relative to the radiation unit, and an end portion of the reflector extends further toward the condenser than the radiation unit so as to position the radiation unit inside the reflector.

3. The infrared light radiation device according to claim 1,
wherein a focal length of the at least one condensing lens is 100 mm or larger when collimated light is incident on the at least one condensing lens from a side at which the radiation unit is disposed.

4. The infrared light radiation device according to claim 1,
wherein the metamaterial structure includes
a first conductor layer,
a dielectric layer coupled to the first conductor layer, and
a second conductor layer that includes a plurality of individual conductor layers which are coupled to the dielectric layer and which are spaced from one another so as to be periodically disposed, and
wherein the first conductor layer, the dielectric layer, and the second conductor layer are arranged in this order from the heater.

5. The infrared light radiation device according to claim 1,
wherein the metamaterial structure has a plurality of micro-cavities spaced from one another so as to be periodically disposed, and at least a surface of each of the plurality of micro-cavities is formed of a conductor.

6. The infrared light radiation device according to claim 1,
wherein a reflection surface of the reflector has a curved shape in section.

* * * * *